United States Patent [19]
Vinot

[11] 4,271,480
[45] Jun. 2, 1981

[54] APPARATUS ENABLING THE TRANSFER OF DATA BLOCKS OF VARIABLE LENGTHS BETWEEN TWO MEMORY INTERFACES OF DIFFERENT WIDTHS

[75] Inventor: Daniel Vinot, Sucy-en-Brie, France

[73] Assignee: Compagnie Internationale pour l'Informatique CII-Honeywell Bull, Paris, France

[21] Appl. No.: 896,189

[22] Filed: Apr. 14, 1978

Related U.S. Application Data

[63] Continuation of Ser. No. 753,493, Dec. 22, 1976, abandoned.

[30] Foreign Application Priority Data

Dec. 31, 1975 [FR] France .................. 75 40362

[51] Int. Cl.³ .................. G06F 3/00; G06F 13/00
[52] U.S. Cl. .................. 364/900
[58] Field of Search ... 364/200 MS File, 900 MS File

[56] References Cited

U.S. PATENT DOCUMENTS

| | | | |
|---|---|---|---|
| 2,913,175 | 11/1959 | Williams et al. | 364/200 |
| 3,739,352 | 6/1973 | Packard | 364/200 |
| 3,771,142 | 11/1973 | Minishull et al. | 364/200 |
| 3,810,117 | 5/1974 | Healey | 364/200 |
| 3,818,461 | 6/1974 | Ward et al. | 364/200 |
| 3,878,513 | 4/1975 | Werner | 364/200 |
| 3,889,241 | 6/1975 | Cordi et al. | 364/900 |
| 3,949,376 | 4/1976 | Ball et al. | 364/200 |
| 3,978,452 | 8/1976 | Barton et al. | 364/200 |
| 4,021,782 | 5/1977 | Hoerning | 364/900 |
| 4,031,515 | 6/1977 | Kashio | 364/900 |
| 4,047,243 | 9/1977 | Dijkutra | 364/200 |
| 4,071,887 | 1/1978 | Daly et al. | 364/200 |

*Primary Examiner*—Mark E. Nusbaum
*Attorney, Agent, or Firm*—Kerkam, Stowell, Kondracki & Clarke

[57] ABSTRACT

An apparatus for transferring data blocks of variable lengths between interfaces of different widths. The apparatus includes a series memory of the first-in, first-out type (FIFO) and an interface means at the input and output of the series memory. The interface means has a first means for storage of input data words and a second means for storage of output data words, the two storage means being of different storage capacity. Means are included for signalling to external devices when the first storage means and the series memory are empty and ready to receive data. Means are also included for controlling in response to an external signal the width of the output data words.

14 Claims, 6 Drawing Figures

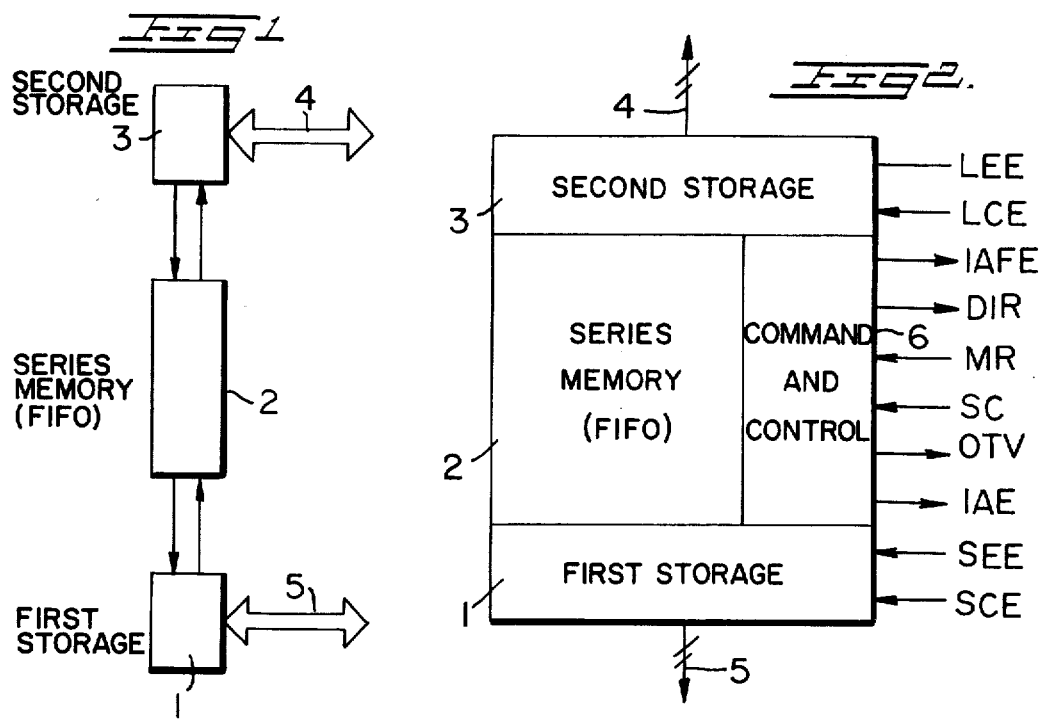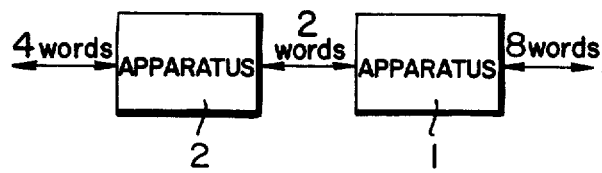

APPARATUS ENABLING THE TRANSFER OF DATA BLOCKS OF VARIABLE LENGTHS BETWEEN TWO MEMORY INTERFACES OF DIFFERENT WIDTHS

CROSS-REFERENCE TO RELATED APPLICATION

This is a continuation of application Ser. No. 753,493, filed Dec. 22, 1976, and now abandoned.

BACKGROUND OF THE INVENTION

The present invention is a system which allows the transfer of data blocks of variable size between two data processing devices, the interfaces of which have different widths.

The system, according to the invention, deals in particular with buffering techniques. There are known dynamic series memories functioning according to a first data in first data out (FIFO) principle. Memories of this type are presently built by manufacturers of integrated circuits. An example of such a dynamic series memory is the MM 15,741 made by Monolithic Memories Incorporated.

As advantageous as these products might be, their use is not flexible and require external adaptations of a more or less complicated nature depending on each buffering problem. This results in costly expenditures for material, difficulties in technical production, increased space requirements and a decrease in performance and reliability in these products.

Progress achieved in the area of the miniaturization of electronic circuits, namely in LSI (Large Scale Integration) techniques, enables a larger integration of circuits. This gives way to important cost reduction, simplifies production diagrams of electronic machines and ameliorates equipment performance.

SUMMARY OF THE INVENTION

The invention is embodied in a new apparatus employing LSI techniques and advantageously providing greater flexibility to the configuration imposed in practice by the interfaces between machines of different speed capabilities which can receive and transmit data groups or blocks of variable size.

The apparatus, according to the invention, includes a first structure which has a dynamic series memory functioning on the principle of "first in first out" (FIFO).

An interface means enables the storage and transfer of entering or exiting data from the apparatus. The interface means consist of a first storage means for the storage of entering data words and of a second storage means for the storage of exiting data words. The storage capacity of each of the first and second storage means is different, one being of relatively large storage capacity, the other being of relatively smaller storage capacity.

A first control means for readout of data stored at the apparatus input as a function of the number of processed words is provided. This number is transmitted by external transmission means and enables the progression of data words inside the dynamic series memory. The first control means is linked on the one hand to the first storage means and on the other hand to timing or synchronization means external to the apparatus in order to insure the synchronization of the data entered into the apparatus.

Second control means are provided to enable the writing of data words exiting from the dynamic series memory (FIFO) into the second data storage means located at the output of the apparatus. This data is entered as a function of the available storage spaces inside the second storage means, the second control means being connected to synchronization means located external to the machine, allowing the synchronization of outgoing information from the apparatus.

Third means for controlling the number of data words transmitted outside the apparatus is also provided. This control means is connected to the second control means for enabling writing into the second storage means. Data words are read into the dynamic series memory as a function of the number of data words already transmitted by the apparatus.

BRIEF DESCRIPTION OF THE DRAWINGS

The invention will be better understood with the help of the following description taken in conjunction with the drawings, in which:

FIG. 1 represents a simplified version of the apparatus system embodying the present invention;

FIG. 2 represents the connecting points of the apparatus with external devices, as well as the main devices which make it up;

FIG. 4 is a time diagram showing the different phases required in a single word transfer;

FIG. 5 is a time diagram showing the different phases required in a two word transfer;

FIG. 6 represents a particular type of buffering for two manufactured machines.

DETAILED DESCRIPTION OF THE DRAWINGS

Figure 3:
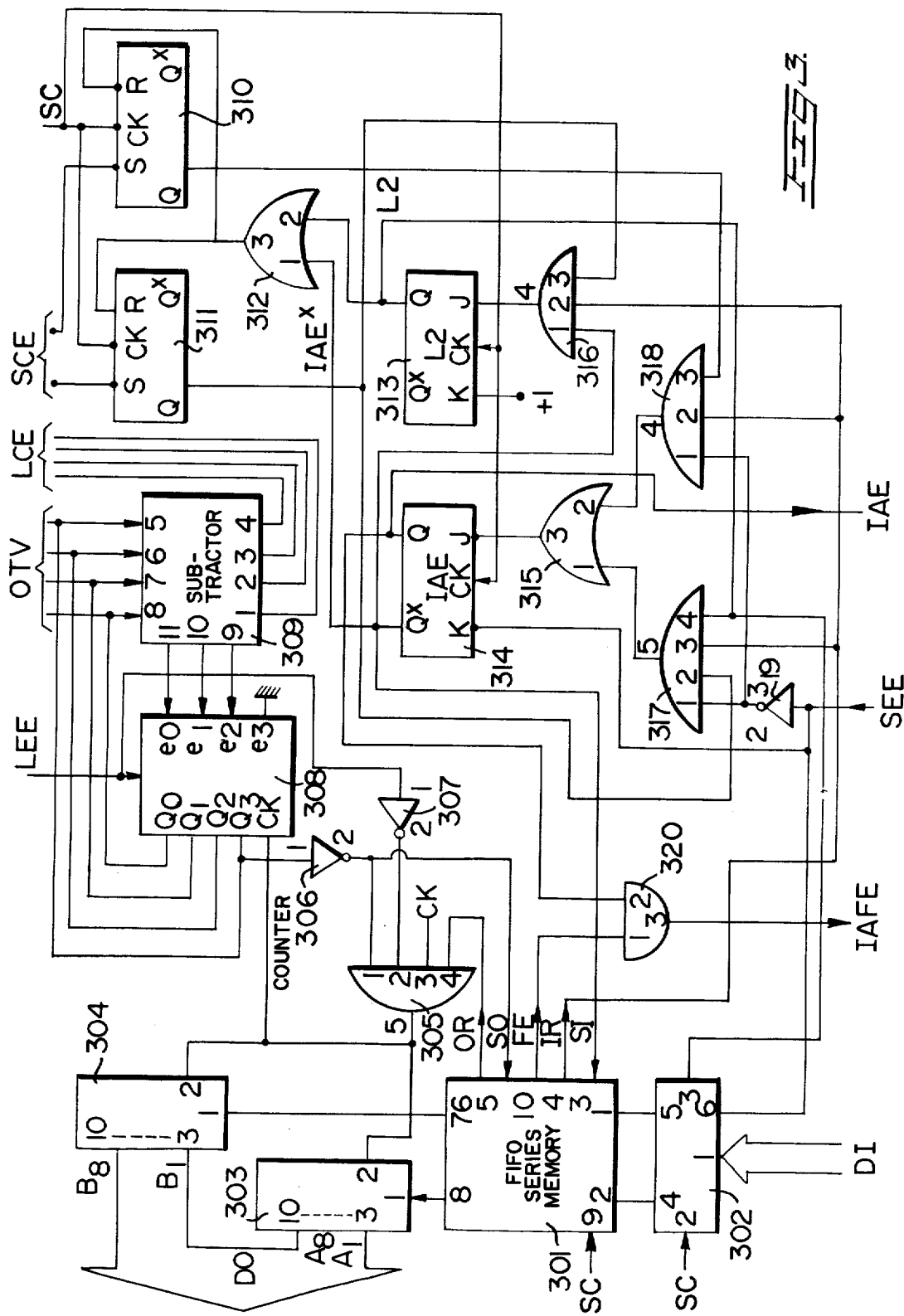
FIG. 3 represents in detailed fashion an example of the internal circuits of the apparatus which allow data transfers between interfaces of different widths.

Referring now to FIG. 1 which represents the machine system of the present invention in simplified form, it will be seen that the apparatus can be represented by three parts shown in FIG. 1 as block elements 1, 2, and 3.

The first part, shown in FIG. 1 as block 1, comprises a first storage area or registers for storing data prior to its output to or after its input from cables. The entry input/output registers of part 1 is a small capacity memory which can handle information with respect to data cable 5 in a bi-directional manner.

The second part, shown in FIG. 1 as block 2, comprises a dynamic series memory having external control and command elements shown in greater detail in FIG. 3 enabling the transfer of data words between the first and third parts of the machine.

The third part represented in FIG. 1 comprises a second storage area or registers to store data prior to its output to or after its input from cable 4. The input/output registers of part 3 can handle information with respect to data cable 4 in a bi-directional manner.

An example of the invention will be presently described. When dealing with transfer of information on cable 5, the description will be given by way of example in terms of handling two-word data blocks. When dealing with transfer or information on cable 4, eight-word data blocks will be used for purposes of describing the invention. Obviously, as will be apparent from the rest of the explanation, the invention is not limited to the handling of only two-word and eight-word data blocks.

Referring to FIG. 2, rectangle 2 represents a dynamic series memory (FIFO) located between the storage areas 1 and 3. The storage capacity of the registers forming storage 1 is smaller than the capacity of the registers forming storage area 3. Rectangle 6 represents the command and control area which is common to both storage areas 1 and 3 and to the dynamic series memory (FIFO) 2. The data cables or busses 4 and 5 are linked to storage areas 1 and 3, respectively. On the right-hand side of FIG. 2, different lines appear which represent the signals for controlling the logic circuits within the apparatus.

Each control line is identified with individual alphabetic reference characters. The DIR line signal defines the direction in which the transfer takes place between the two interfaces.

Assuming, for example, that the machine is linked by data cable or buss 4 on the one hand to a fast memory and by data cable or buss 5 to a peripheral unit, not shown, on the other hand, the DIR signal will assume a level 1 to signify a data entry into the memory coming from the peripheral unit; or it will assume level 0 if the transfer of data takes place in the other direction; in other words, out of the memory.

Line MR is used to initialize the logical command and control area 6 of the apparatus prior to the beginning of a new data input or output operation.

Signals at line SC are used to synchronize the apparatus.

Line OTV, in the example, comprises four wires capable of handling two different types of information. With respect to input data, the signal at line OTV provides the coded number, in natural binary form, of data words which are present in register 3. In the described example, the number is between 0 and 8. This information is transferred in synchronization with clock signals which appear on line SC. With respect to output data, only two wires are significant. Signals on these wires provide a number of data variables which are present in the register 1 having a more limited storage capacity. In the described example for two-word data, this number is between 0 and 2, and this information is transferred in synchronization with the clock signals appearing on line SC.

The signals appearing at line IAE indicate, with respect to input of data, that the two registers in storage area 1 are empty and that a new operation can be performed. Signals at IAE also indicate, with respect to output of data, that the eight registers in the storage area 3 are empty and that a new operation can be performed.

Signals appearing at line IAFE allow the determination of two facts: with respect to an input, the signals indicate that the dynamic series memory 2 and the registers of storage area 1 are empty; with respect to output data, signal at IAFE indicate that the dynamic series memory (FIFO) 2 and the registers of storage area 3 are empty. The line (IAFE) can be used along with other external signals in order to determine the end of an active transfer of data and for enabling the use of remaining data.

Signals appearing at line LEE indicate to the apparatus that an operation or phase is being performed which requires either that data be taken into account or that data be fed or written in an input phase. The signals at line LEE also serve to validate the values indicated by the signals at line LCE. Line LCE consists of four wires, and signals appearing thereon serve to control or indicate how data is to be treated during an operation or phase when a signal at LEE is present.

Signals on line SEE serve to indicate to the apparatus that an operation or phase is being performed either to write in data on an input phase or to take into account data on an output phase. These signals confirm the value indicated by the signal wires which make up line SCE. Line SCE consists of two wires and indicates how much data is taken during a phase when SEE are present.

The input and output data lines provide for the transfer of eight words of two bits each. Data line 4 is associated with the storage area 3 which has relatively greater storage capacity than storage area 1 and which allows for bi-directional transfer of data. The transfer of data via data line 5 which associated with the lower capacity storage area 1 also occurs bi-directionally.

Referring to FIG. 3, there is illustrated in detailed form an example of the internal logic circuits of the apparatus embodying the invention.

In order to simplify the explanation, the operation will be described in connection with enabling data input phases in the fast memory. Output data phases require identical circuits to those which will be described for an input phase; however, it is not believed necessary to include them twice for an understanding of the invention as the arrangement for the output data phases will be obvious to those having ordinary skill in the art in view of the illustration of FIG. 3 and the corresponding description.

The apparatus shown in FIG. 3 comprises a set of seven circuit means which combine to allow the transfer of data blocks. The first circuit means comprises a dynamic series memory 301 which functions on the aforementioned FIFO principle. The data to be transferred inside this memory enters through terminals 1 and 2. A single data word can be entered each time. The word consists of two bits which may be weighted. The least significant bit is applied to terminal 1; the other bit enters on terminal 2.

Terminal 3 is connected to receive the wire transmitting signal of command word SI, presented on terminals 1 and 2 and stored inside series memory 301.

Terminal 4 of memory 301 is connected to the IR line transmitting the signal IR which indicates that the input of series memory 301 is available to recieve a word.

Terminal 5 of memory 301 is connected to the line SO over which the signal SO is transmitted. The SO signal commands the word output via terminals 7 and 8 of series memory 301 which are in turn connected to the terminal 1 inputs of registers 303 and 304, respectively. Output terminal 6 of memory 301 is connected to the OR line which transmits the OR signal which indicates that a word to ready to leave the series memory 301. Input terminal 9 is connected to the SC line over which clock signal SC is transmitted for synchronization.

Output terminal 10 is connected to input terminal 1 of AND gate 320 via line FE which transmits the FE signal when the dynamic series memory 301 is empty.

The series memory 301 comprises a plurality of registers. After a word is entered in the first register, it is transmitted in turn to the following registers according to the clock's rhythm SC, until it is entered into the last register. Each word is entered in a register which precedes the register in which the last word was entered.

The second circuit means making up the interface with the exterior of the apparatus comprises a first means whose function is to store the input data in the apparatus and of a second means, whose function is to store the output data. The first means is illustrated in FIG. 3 by register 303 which can store two words each having a width of two bits. The two words (designated as the first and second words) are entered in the four wires or lines comprising the data buss DI, which serves to connect the apparatus to the external peripheral unit. In order to simplify the drawing, only one input or entry has been shown identified as terminal 1 of register 302. Register 302 receives the synchronization signal SC at its input terminal 2. The writing of one or two words is done through the application of a writing command signal at register input 6. It is possible to only write a single word if this word still corresponds to a register's frame (as an example of a first word fixed).

The data output from register 302 is done a word at a time through output terminals 4 and 5 which are connected to the 1 and 2 inputs of the dynamic series memory 301. The readout selection of the two words contained in register 302 is performed by applying a signal on input terminal 3 of the register 302 which may be taken from the Q output of JK flip flop 313. For example, if entry 3 of register 302 is at logic 0, it will be the first word to be read. If entry 3 of register 302 is at logic 1, it will be the second word to be read.

Signals commanding writing of data into register 302 are transmitted over the wire linking terminal 6 of the register to the SEE input terminal of the apparatus. The signal which commands the writing in register 302 is furnished by the wire linking terminal 3 to the JK flip-flop 313 which goes to level 1 each time the second word in register 303 is to be read. The third circuit means making up the interface with the exterior of the apparatus is represented by two shift registers 303 and 304. Input terminals 1 of these registers are linked in turn to output terminals 7 and 8 of the series memory 301. Registers 303 and 304 receive at their input terminals 2 a clock signal which registers a shift command at each of its cycles. The shift registers shift series of bits from one position to another in each of the registers. Input terminal 2 of each of these registers is linked to the output of a four-input AND gate 305, whose function is to allow the transmission of clock signals to terminals 2 for each of registers 303 and 304.

Terminals 3 to 10 of the shift registers 303 and 304 are linked to wires, designated $A_1$ to $A_8$ and $B_1$ to $B_8$, respectively, which constitute data cable DO. Cable DO connects the apparatus to an external fast memory (not shown).

When a word comes out of the dynamic series memory 301 through terminals 7 and 8, it is entered in registers 303 and 304 through their input terminals 1. The least significant is entered in register 304. When the two registers 303 and 304 are filled, the bit positions of the corresponding data words correspond to one another at each bit position of a register. Thus, the first words entered are thereafter represented by the value couple $B_8$, $A_8$, and the last words entered are represented by the value couple $B_1$, $A_1$. Data which has eight words of two bits each will be re-transmitted via data cable DO in the following order:

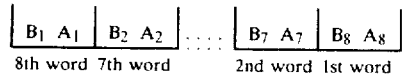

| $B_1$ $A_1$ | $B_2$ $A_2$ | .... | $B_7$ $A_7$ | $B_8$ $A_8$ |
8th word  7th word          2nd word  1st word The fourth circuit means of the apparatus is a control means which enables the readout of the data storage means at the entry or input of the apparatus in relation to the number of treated words inside the series memory 301. This fourth circuit means comprises a set of two RS flip-flops 310 and 311 and two JK flip-flops 313 and 314.

RS flip-flops 310 and 311 are linked by their S inputs to two wires of the SCE line which links the apparatus with the external peripheral equipment. These flip-flops indicate during an entry transfer if the data transfer in register 302 occurs on a single or a double word length. If it occurs on a single word length the flip-flop 310 will assume state 1; if it occurs on a double word length, flip-flop 311 will assume state 1. The reset back to 0 of these two flip-flops occurs when a logic 1 is applied to the reset input marked R which is linked to output 3 of two input gate OR 312.

The first input to OR gate 312 is linked to the Q* output terminal of flip-flop 314. The second input of OR gate 312 is linked to the Q output terminal of flip-flop 313.

RS flip-flops 310 and 311 are therefore set back to 0 each time JK flip-flop 314 is in the 0 state or each time JK flip-flop 313 is in 1 state. Resetting of flip-flops occurs in synchronization with the clock signal applied to the wire linking input CK of each flip-flop to the apparatus outside terminal receiving sync signal SC. The JK flip-flop 314 generates signal IAE at its Q terminal. Signal IAE is present when flip-flop 314 is at state 1. The change to state 1 of the flip-flop occurs with the application of a logical 1 to its J input. Input J of flip-flop 314 is linked to output terminal 3 of OR gate 315 which has two inputs. Input 1 to OR gate 315 is linked to output 5 of AND gate 317. Input 2 to OR gate 315 is linked to output terminal 4 of AND gate 318. Input 1 to AND gate 317 is linked to output terminal 2 of an inverter 319 whose input is in turn linked or connected to the peripheral equipment via the outside terminal of the machine receiving signal SEE. Input terminal 2 of AND gate 317 is linked to Q output of flip-flop 311, thus activating AND gate 317 when a two word transfer is occurring.

AND gate 317 has its input terminal 3 connected to the IR line of series memory 301, terminal 4. This enables AND gate 317 when the entry record of the series memory 301 is empty and therefore ready to receive a word. Terminal 4 of AND gate 317 is linked to the Q output of JK flip-flop 313 enabling gate 317 during the reading cycle of the second word of register 302. AND gate 318 is activated for the reading cycles of a single word. To this end, input 1 to AND gate 318 is linked to the output 2 of the inverter 319. Input 2 to AND gate 318 is linked to the IR line of series memory 310, output terminal 4 thereof, and input 3 to AND gate 318 is linked to the Q output of the RS flip-flop 310. This activates gate 318 for reading cycle of a register word. Flip-flop 314 is reset to zero (0) by applying a 1 on its K input, which is linked to the apparatus outside terminal adapted to receive signal SEE. JK flip-flop 313 generates signal L2 which is present when flip-flop 313 is at logical state 1. Input J of flip-flop 313 is linked to output terminal 4 of AND gate 316 having three inputs. Input terminal 1 of gate 316 is connected to the Q* terminal of flip-flop (IAE) 314. Input terminal 2 of gate 316 is connected to the IR line of series memory 301, and input 3 of gate 316 is connected to the Q output of flip-flop 311.

Flip-flop 313 has its K input maintained at a logic 1 level. Flip-flop 313 is enabled according to the clock cycle which follows the one which sets its state.

The fifth circuit means of the apparatus comprises a control means that enables the writing of data words, exiting from series memory 301 and entering storage areas (registers) 303 and 304, in available storage areas. This control means includes AND gate 305 and inverters 306 and 307. The output of AND gate 305 is connected to inputs 2 of registers 303 and 304. The inverter 306 has its output connected to the 1 input terminal of gate 305 and also feeds the SO line of the memory 301.

Input 2 of AND gate 305 is linked to the output 2 of inverter 307. Input 3 of gate 305 is linked to the apparatus outside terminal SC.

Input 4 of gate 305 is linked to terminal 6 of series memory 301 (OR line) and is raised to logical 1 when the OR signal is present.

Inverter 306 has its input 1 connected to the $Q_3$ output terminal of counter 308 and is at logical 1 each time eight words are present in the output registers 303 and 304. Input 1 of the inverter 307 is connected to the outside terminal of the machine receiving signal LEE.

The sixth circuit means of the apparatus includes a parallel input counter 308 and subtractor 309. The counter 308 has a further clock input CK connected to output terminal 5 of gate 305 such that its progression occurs simultaneously with the filling up of registers 303 and 304. The clock input enables the initiation of counting in counter 308 at a predetermined value, by the state of the bits which are present on the parallel entries $E_0$ to $E_3$. The counting is done in a natural binary form. The subtractor 309 is connected at its inputs 1, 2, 3, 4 to outside terminals of the apparatus to the four wires of line LCE; and on its 5, 6, 7, 8 inputs to the output terminals $Q_0$, $Q_1$, $Q_2$, $Q_3$ of counter 308. The output terminals $Q_0$, $Q_1$, $Q_2$, $Q_3$ of counter 308 are also connected to output terminals via from wires of line OTV.

The function of subtractor 309 is to subtract binary values of the OTV and LCE signals. The result appears on output terminals 9, 10, 11 of subtractor 309. Outputs 9, 10, 11 indicate how many data words remain in registers 303 and 304. Outputs 9, 10 and 11 of subtractor 309 are each linked in turn to inputs $e_2$, $e_1$, $e_0$ of counter 308.

The seventh circuit means comprises a two-input AND gate 320. Gate 320 receives on its 1 input a signal FE coming from the dynamic series memory 301 and on its 2 input, a signal IAE transmitted on the wire connecting input 2 to the Q output of JK flip-flop IAE 314. Output 3 of AND gate 320 generates signal IAFE which is transmitted external to the apparatus and indicates that the dynamic series memory and lower capacity storage area are empty.

Thus, when a transfer is completed at the DI cable level, the peripheral equipment by reading the IAFE state will known that remains in the machine at the register 302 and in the dynamic series memory 301.

In the hypothesis where cable DI is linked to a peripheral unit, a writing phase into the external fast memory of information read from the peripheral unit occurs as follows:

At the end of each reading of register 302, the flip-flop IAE 314 is set back to 1 by OR gate 315 if signal IR of memory 301 is available. This means that the entry register on this memory is empty. New data can therefore be transferred into the apparatus by cable DI. Line SEE, when it is at logical 1, indicates that the present data on cable DI is available. Simultaneously, when SEE is at logical 1, line SCE indicates the correct number of words to transfer.

If only one word is correct, flip-flop 310 assumes state 1. If only two words are correct, flip-flop 311 assumes state 2. Line SEE being raised to logical 1 enables the present data on cable DI to be transferred to register 302, by raising input 6 of this register to logic 1.

The register 302 writing takes place during a clock cycle. At the end of the cycle, flip-flop 314 is set back to 0 by conditions SEE=1 on its input and the fallback of the clock signal SC. Output $Q^x$ of flip-flop IAE 314 is therefore at state 1 and activates input 3, the SI line of series memory 301 allowing oe word to be written into the memory. The writing occurs one clock cycle after the signal IAE falls back.

In the case of a single word transfer, flip-flop 310 is at state 1 and enables the 3 input of gate 318.

The setback to 1 of flip-flop 314 occurs if three conditions (SEE=0, IR=1 and Q output of 310=1), are all present during the fallback of clock signal SC. This occurs at the time the word is fed into memory 301. IAE being at logic 1 once more, a new transfer operation can begin again.

In the case of a two word transfer, flip-flop 311 takes logical state 1 and enables the 2 input of gate 317. The setting back to 1 by JK flip-flop IAE 314 occurs, if the following four conditions are present: SEE=0, output Q of flip-flop 311=1, signal L2=1, and output Q of $L_2$ flip-flop 313=1. Flip-flop 313 (L2) going to 1 enables the feeding or writing of the second word into memory 301. Flip-flop 313 goes to 1 when the following three conditions at input AND gate 316 are present. IAE=0; signal IR=1; and output Q of flip-flop 311=1. This occurs when the word has just been transferred into memory 301. The IAE flip-flop 314 upon returning to state 1 indicates that the register 302 is empty and that a new phase can be performed. The data read into register 302 is fed at the clock beat in the series memory 301.

The IAE flip-flop 314 upon returning to state 1 indicates that the register 302 is empty and that a new phase can be performed. The data read into register 302 is fed at the clock beat in the series memory 301.

When a word reaches the output end of series memory 301, its arrival is indicated by OR signal going to 1 which then enables input 4 of gate 305. If no data extractions are in progress on the DO line or buss (LEE=0) and if counter 308's state is not at its eighth position, the word is allowed to exit from memory 301 through signal SO present on 5 input, and the transfer occurs in the first position of registers 303 and 304. The phase occurs at each clock movement thereafter for words ready to exit from memory 301. When eight words are thus fed into registers 303 and 304, output $Q_3$ of counter 308 assumes state 1. Thus, by this fact, it indicates that an extraction phase can be performed. The extraction phase comprises transferring data stored in registers 303 and 304 to the fast outside memory through data buss DO.

The logical 1's position on line LEE indicates to the apparatus that the present data on line DO have been accounted for and simultaneously line LCE indicates in a natural binary code the number of words that have been extracted. This information is used by the control logic of the apparatus to set the indicated value on line OTV which is also expressed in a natural binary code.

The subtractor 309 determines the difference between values OTV and LCE and reinitiates counter 308 to the binary value which appears on its inputs $e_0$, $e_1$, $e_2$. Reinitiation makes output $Q_3$ from counter 308 fall back, enabling again the filling up of registers 303 and 304 by new words arriving at series memory 301. The counter 308 combined with subtractor 309 has the function of:

1. Insuring the monitoring of data word outflow while filling up the storage records with an equal amount of words to that transmitted outside the machine; and
2. Acting on the width of outgoing data on the interface. This width is ordered by a directive given external of the apparatus by the information transmitted on line LCE.

Thus, if the apparatus has a large area of outgoing data which is able to contain n words and is linked to an external receiver connected to the machine by a link of 2n wires (in a case where a word has two bits), the data readout will be possible in any width. The data will be taken among possible values from 1 to n words. The width adjustment is insured by lines LCE in numbers x + 1, in such a way that n = 2x. The same applies for the monitoring of word output in the storage area of entering data.

The monitoring of entering data is insured by the flip-flop IAE 314 which controls the data transfer as a function of transferred words indicated by line SCE. The width control of entering data of the interface is also controlled by line SCE.

Thus, if the machine has a storage area of entering data of m words, the data readout in the machine will be able to be any width between 1 and m using 2, 4 ... 2m wires if the width of a word carries over on two bits and there will be a need for x + 1 command wires SCE so that m = 2x. FIGS. 4 and 5 represent the time evolution of signals IAE and SEE as well as the successive transfer periods which have just been described.

It is quite evident that the data transfer used in the previously described machine must be also feasible in the other direction.

In this case register 302 will have to have a capacity of 16 bits instead of 4 bits. The role of the linking cables DO and DI will be reversed. Cable DO will have to enter on the parallel input of register 302 with 16 bits. Cable DI will have to be connected to the output of two shift registers with two bits. Counter 308 then has a capacity of two. The shift between one means of transfer and another will have to be commanded by signal DIR applied to an outside terminal of the apparatus.

FIG. 6 represents a particular assembly (method) using the mergers of two apparatus currently produced. FIG. 6 shows an adaptation between an interface of four and an interface of eight words. The four words are applied at the input of the storage area of the apparatus 2 which can contain them since its maximum capacity is at eight.

At the output, the lower capacity storage area with an output of no more than two words is connected to the storage area of smaller capacity of machine 1 to come out again on the larger capacity storage area, in the form of eight words. Naturally, the transfer can also occur in the reverse direction.

Other combinations of such machines are possible, and in particular, they would be able to set up in parallel or in parallel series according to the type of adaptation desired. The example just given is only one possible use of the invention. It should be apparent that one skilled in the art will be able to add different variables without departing from the true spirit and scope of the invention.

I claim:

1. Apparatus for transferring data words between a first external device and a second external device, the two external devices having respective interfaces which transfer data in data word blocks having respective different numbers of data words each, said apparatus comprising:

a source of clock pulses;

an apparatus ready output (IAE) for indicating when said apparatus is ready to receive new input data from one of the external devices;

an apparatus input (SEE) for receiving a signal indicating input data (DI) is available from said one of the external devices;

a series first-in-first-out (FIFO) memory type, said FIFO memory having a plurality of registers and operable when a data word is entered in its first register to transfer the data word to its last register, and operable to transfer each subsequently entered data word to a register which precedes the register in which the last word was entered;

a first storage means having a storage capacity of m data words and adapted for connecting to said one of the external devices for receiving and temporarily storing successive input data blocks of m words each, where m is set to equal the number of data words in each data word block transferred through the interface of whichever external device said first storage means is connected to;

means connecting said first storage means to the input of said FIFO memory for serially entering successive data words in the first register of said FIFO memory from said first storage means;

said FIFO memory having an input ready output (IR) for indicating when said first FIFO register is empty;

control circuitry responsive to said source of clock pulses and arranged, when said apparatus input data available input (SEE) receives a signal indicating data is available, to enable said first storage means for the clocking in of data and, upon a subsequent clock pulse, to enable said FIFO memory to clock in data from said first storage means; and, including control means responsive to said FIFO memory input ready output (IR) indicating the first FIFO register is empty and the external input data available signal (SEE) is not present, to provide an apparatus ready output signal (IAE);

a second storage means having a storage capacity of n data words for serially receiving and temporarily storing successive input data words in response to clock pulses until n data words have been stored, thereby forming output data blocks of n data words, and said second storage means adapted for connection to the other of the external devices for outputting data blocks of n data words to the other external device, where n is set to equal the number of data words in each data word block transferred through the interface of whichever external device said second storage means is connected to;

means connecting the input of said second storage means to the output of said FIFO memory for serially transferring successive data words from the last register of said FIFO memory until n data words have been transferred; and counting and control circuitry for determining when said second storage means contains n data words ready for output to the other of the external devices, said counting and control circuitry, in such event, inhibiting data output from said FIFO memory and providing an apparatus output data ready output.

2. Apparatus according to claim 1, wherein n is greater than m, and each block of n data words output to the other of the external devices constitutes several successively transferred data blocks each of m data words from that one external device.

3. Apparatus according to claim 2, wherein the one external device is the first external device, and the other external device is the second external device, whereby data is transferred from the first to the second external device.

4. Apparatus according to claim 3, whereby m is equal to two, and n is equal to eight.

5. Apparatus according to claim 1, wherein m is greater than n, and successive data blocks output to the other external device are each of n data words constituting portions of a data block of m data words from the one external device.

6. Apparatus according to claim 5, wherein the one external device is the second external device, and the other external device is the first external device, whereby data is transferred from the second to the first external device.

7. Apparatus according to claim 6, wherein m is equal to eight, and n is equal to two.

8. Apparatus according to claim 1, wherein said first storage means is adapted for alternative connection to either the one or the other external device, and said second storage means is correspondingly adapted for connection to either the other or the one external device, whereby bi-directional data transfer is possible.

9. Apparatus according to claim 1, wherein said second storage means comprises a plurality of serial-input, parallel-output registers having their serial inputs arranged in parllel for receiving data words from said series memory, each register corresponding to one bit of the data words.

10. Apparatus according to claim 1, wherein said second storage means comprises a shift register having a serial input linked to an output of said series memory.

11. Apparatus according to claim 1, wherein said counting and control circuitry further includes means controlled by the other external device for determining the number of data words in the data blocks output to the other external device.

12. Apparatus according to claim 11, wherein the number of words in the output data blocks is transferred in the form of a word of $x+1$ bits, where $n=2^x$.

13. Apparatus according to claim 11, wherein said means for determining the number of data words in the data block output includes a subtractor having a first input connected for receiving the number of words stored in said second storage means and a second input connected for receiving the number of words effectively transferred to the other external device.

14. Apparatus according to claim 13, wherein transfer of data occurs bi-directionally between the two external devices.

* * * * *